United States Patent
Shen

(10) Patent No.: US 8,619,059 B2
(45) Date of Patent: Dec. 31, 2013

(54) RESISTIVE TOUCH PANEL CAPABLE OF OPERATING IN MULTI-TOUCH CONTROL MODE AND SENSING-DRAG CONTROL MODE SYNCHRONOUSLY

(76) Inventor: Jia-You Shen, Taichung (TW)

( * ) Notice: Subject to any disclaimer, the term of this patent is extended or adjusted under 35 U.S.C. 154(b) by 165 days.

(21) Appl. No.: 13/351,509

(22) Filed: Jan. 17, 2012

(65) Prior Publication Data
US 2012/0113052 A1  May 10, 2012

Related U.S. Application Data

(63) Continuation-in-part of application No. 12/398,192, filed on Mar. 5, 2009, now abandoned.

(51) Int. Cl.
*G06F 3/045* (2006.01)
(52) U.S. Cl.
USPC .......................................................... 345/174
(58) Field of Classification Search
None
See application file for complete search history.

(56) References Cited

U.S. PATENT DOCUMENTS

| 4,839,634 A | 6/1989 | More et al. |
| 2005/0110766 A1 | 5/2005 | Kent et al. |
| 2007/0152982 A1 | 7/2007 | Kim et al. |

*Primary Examiner* — Nicholas Lee
(74) *Attorney, Agent, or Firm* — Munch, Geissler, Olds & Lowe, PLLC

(57) ABSTRACT

A resistive touch panel comprises a touch layer, a spacer layer, a sensing layer and a controller. The touch layer and sensing layer are separated by the spacer layer and respectively have a plurality of strip-like touch loops and a plurality of strip-like sensing loops arranged staggeredly up and down. The controller connects two terminals of the touch loops and sensing loops and controls voltages supplied thereto to enable a digital-mode driving and an analog-mode driving respectively corresponding to digital time series and analog time series that are alternately and consecutively provided. Thus the controller can perform multi touch and drag path, and select the digital-mode driving or analog-mode driving through a switch. Therefore is realized a resistive touch panel that is capable of operating in a multi-touch control mode and a sensing-drag control mode synchronously.

5 Claims, 6 Drawing Sheets

RESISTIVE TOUCH PANEL CAPABLE OF OPERATING IN MULTI-TOUCH CONTROL MODE AND SENSING-DRAG CONTROL MODE SYNCHRONOUSLY

This application is a continuation-in-part, and claims priority, of from U.S. patent application Ser. No. 12/398,192 filed on Mar. 5, 2009, now abandoned entitled "MULTI-TOUCH AND HANDWRITING-RECOGNITION RESISTIVE TOUCHSCREEN", the entire contents of which are hereby incorporated by reference.

FIELD OF THE INVENTION

The present invention relates to a touch panel, particularly to a resistive touch panel capable of operating in a multi-touch control mode and a sensing-drag control mode synchronously.

BACKGROUND OF THE INVENTION

Refer to FIG. 1. In a digital resistive touch panel, a spacer 1A separates two films 2A and 3A; X-axis electrodes 4 and Y-axis electrodes 5 are respectively arranged on the films 2A and 3A; a controller 6A connects the ends of the X-axis electrodes 4 and Y-axis electrodes 5. By pressing to allow the two films 2A and 3A to contact each other, the X-axis electrodes 4 and Y-axis electrodes 5 are short-circuited, whereby the controller 6A can detect the position where the user presses.

Refer to FIG. 2. In a four-wire analog resistive touch panel, a spacer 1B separates two films 2B and 3B; two conductive layers 7 and 8 are respectively coated on the two films 2B and 3B; conductive contact layers 9 are arranged on two edges of the conductive layers 7 and 8, and two terminals at the conductive contact layers 9 of the conductive layers 7 and 8 in different directions. The controller 6B supplies a voltage to one edge of the film 2B. When the user presses to allow the two films 2B and 3B to contact each other, the controller 6B detects the divided voltages of the other three terminals of the film 2B and the other three terminals of the film 3B and calculates the position where the user presses.

The above-mentioned digital resistive touch panel has the multi-touch function but cannot sense the dragging path, i.e. lacks the handwriting-recognition function. The above-mentioned analog resistive touch panel can sense the dragging path but lacks the multi-touch function. Thus, the user cannot have both functions when using only one of the above-mentioned touch panels.

A US publication No. 2007/0152982 entitled "Input Device Supporting Various Input Modes and Apparatus Using the Same" discloses a portable device with a touch panel that has a telephone number input mode and a handwriting input mode. In the telephone number input mode, point touch can be performed. In the handwriting input mode, drag path sensing can be performed to do handwriting. However, the point touch and the drag path sensing can only be undertaken in separate input modes, and they cannot be operated in the same input mode at the same time. Therefore, the prior art still has room to improve.

SUMMARY OF THE INVENTION

The primary objective of the present invention is to provide a resistive touch panel capable of operating in a multi-touch control mode and a sensing-drag control mode synchronously, whereby the user can perform multi-touch and handwriting synchronously.

The resistive touch panel of the present invention comprises a touch layer, a spacer layer, a sensing layer and a controller. The touch layer has a plurality of strip-like touch loops. Each touch loop has a first touch terminal and a second touch terminal, and two conductive contact layers are respectively arranged at the two terminals of the touch loop. The sensing layer has a plurality of strip-like sensing loops. Each sensing loop has a first sensing terminal and a second sensing terminal, and two conductive contact layers are respectively arranged at the two terminals of the sensing loop. The spacer layer is formed at a selected thickness to separate the touch layer and the sensing layer such that the touch loops and the sensing loops are arranged staggeredly up and down.

The controller is respectively connected to the first touch terminals, the second touch terminals, the first sensing terminals and the second sensing terminals via the conductive contact layers. In an automatic operation mode, the controller automatically detects and outputs digital-mode voltages and analog-mode voltages respectively corresponding to a plurality of digital time series and a plurality of analog time series that are alternately and consecutively provided.

In the digital time series, the digital-mode voltage is input to the first touch terminals and the first sensing terminals via the conductive contact layers, and when the touch loops and the sensing loops form short circuit, the controller can detect the digital short-circuit position where the touch loops and the sensing loops are short-circuited, and perform multi-touch judgment. In the analog time series, the analog-mode voltage is input to the first touch terminals via the conductive contact layer, and when the touch loops and the sensing loops form short circuit, the controller can detect the divided voltages of the second touch terminals, the first sensing terminals and the second sensing terminals and calculate to obtain the analog short-circuit position where the touch loops and the sensing loops are short-circuited, and perform drag path judgment.

In the present invention, the controller alternately supplies the digital-mode voltage and the analog-mode voltage in different time series to perform the digital-mode driving and the analog-mode driving simultaneously in an identical automatic operation mode. Thus is realized a resistive touch panel that is capable of operating in a multi-touch control mode and a sensing-drag control mode synchronously.

DETAILED DESCRIPTION OF THE PREFERRED EMBODIMENTS

Below, the preferred embodiments are described in detail in cooperation with the drawings.

Figure 1:
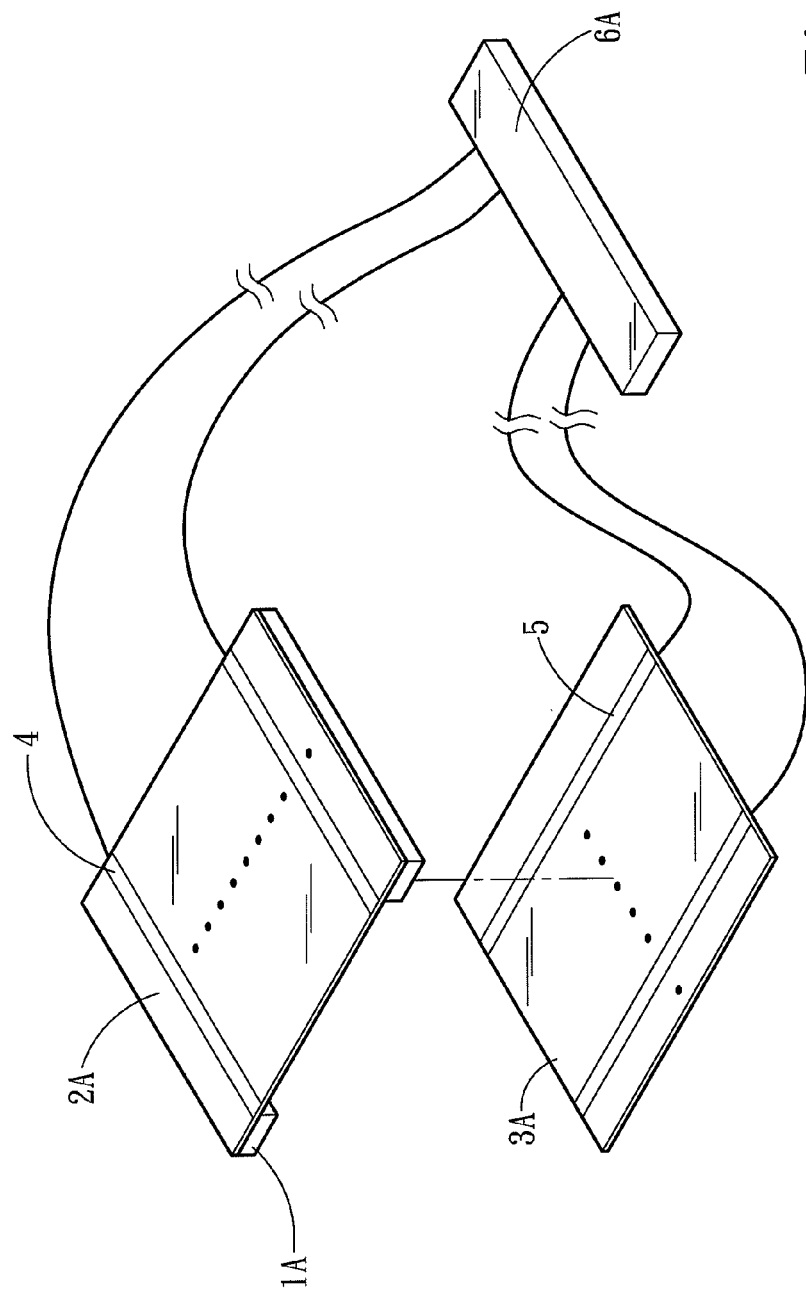
FIG. 1 is a diagram schematically showing a conventional digital resistive touch panel.
Figure 2:
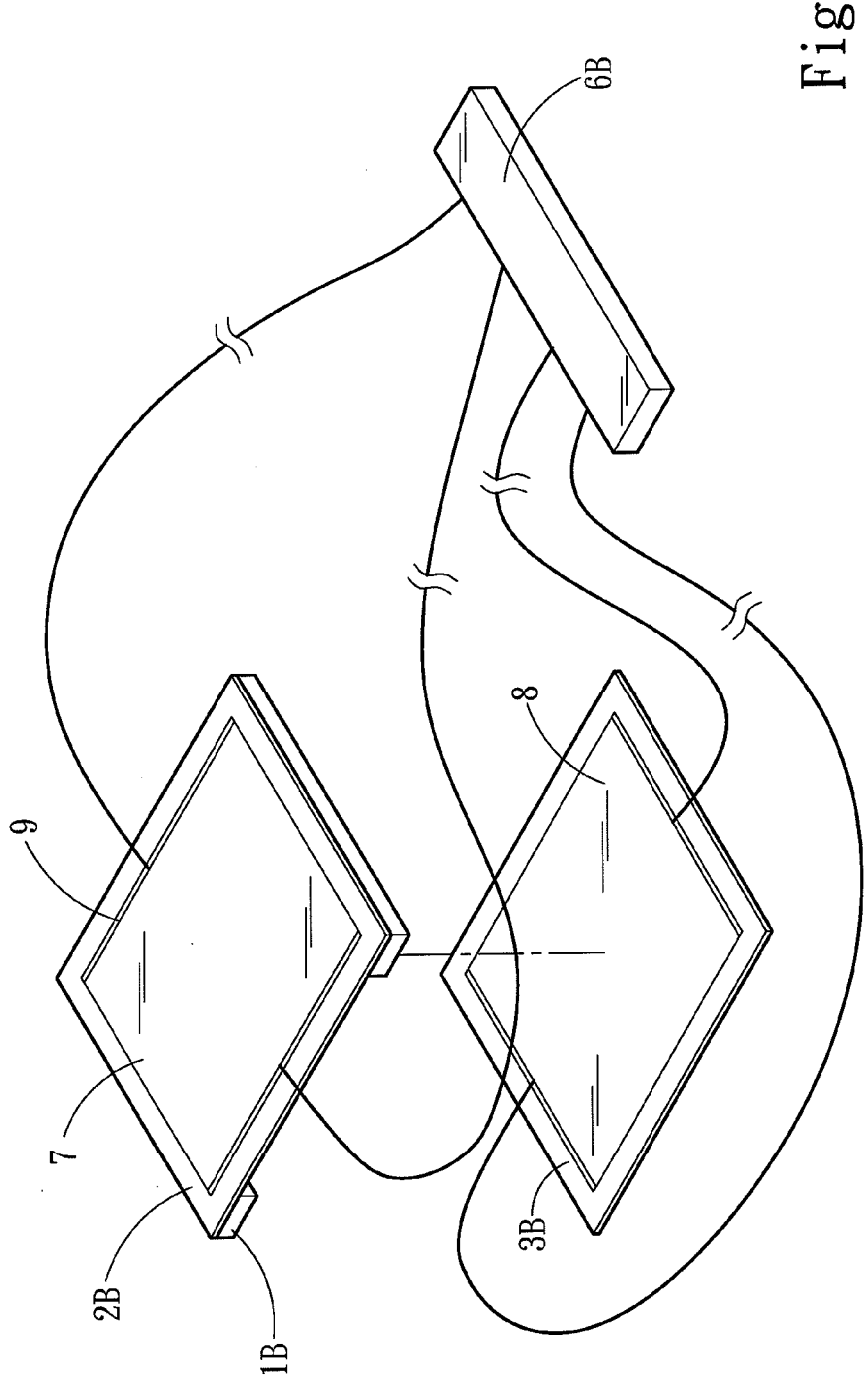
FIG. 2 is a diagram schematically showing a conventional analog resistive touch panel.
Figure 3:
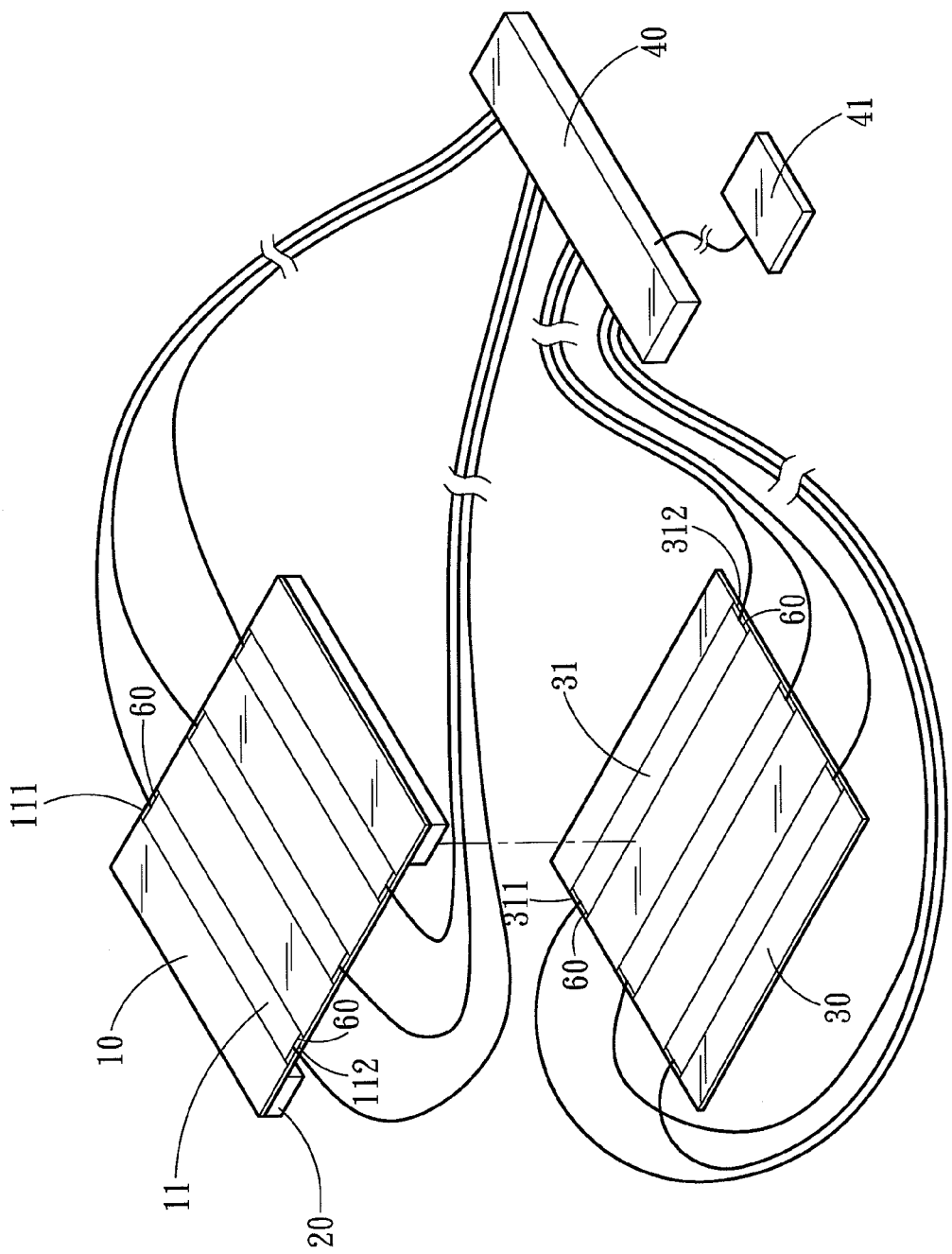
FIG. 3 is a diagram schematically showing the structure of a resistive touch panel capable of operating in a multi-touch control mode and a sensing-drag control mode synchronously according to one embodiment of the present invention.

Refer to FIG. 3. The resistive touch panel of the present invention comprises a touch layer 10, a spacer layer 20, a sensing layer 30 and a controller 40. The touch layer 10 has a plurality of strip-like touch loops 11. The touch loop 11 has a first touch terminal 111 and a second touch terminal 112. Two conductive contact layers 60 are respectively arranged at the two terminals of the touch loop 11. The conductive contact layers 60 are made of a low-resistance material. The sensing layer 30 has a plurality of strip-like sensing loops 31. The sensing loop 31 has a first sensing terminal 311 and a second sensing terminal 312. Two conductive contact layers 60 are respectively arranged at the two terminals of the sensing loop 31. The spacer layer 20 is formed at a selected thickness. The touch layer 10 and the sensing layer 30 are separated by the spacer layer 20 such that the strip-like touch loops 11 and the strip-like sensing loops 31 are arranged staggeredly up and down.

The controller 40 is respectively connected to the first touch terminals 111, the second touch terminals 112, the first sensing terminals 311 and the second sensing terminals 312 via the conductive contact layers 60. In the resistive touch panel of the present invention, there are numerous touch loops 11 each having the first touch terminal 111 and the second touch terminal 112 and numerous sensing loops 31 each having the first sensing terminal 311 and the second sensing terminal 312. However, only three touch loops 11 and three sensing loops 31 are drawn in the drawings for exemplification.

Figure 4:
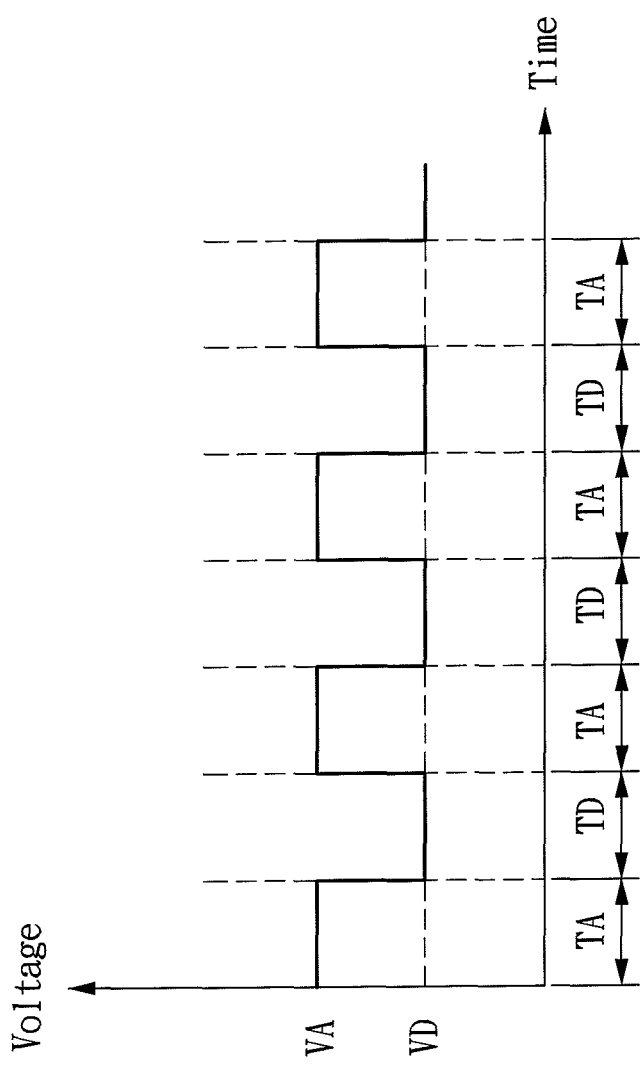
FIG. 4 is a diagram schematically showing the time series according to one embodiment of the present invention.
Figure 5B:
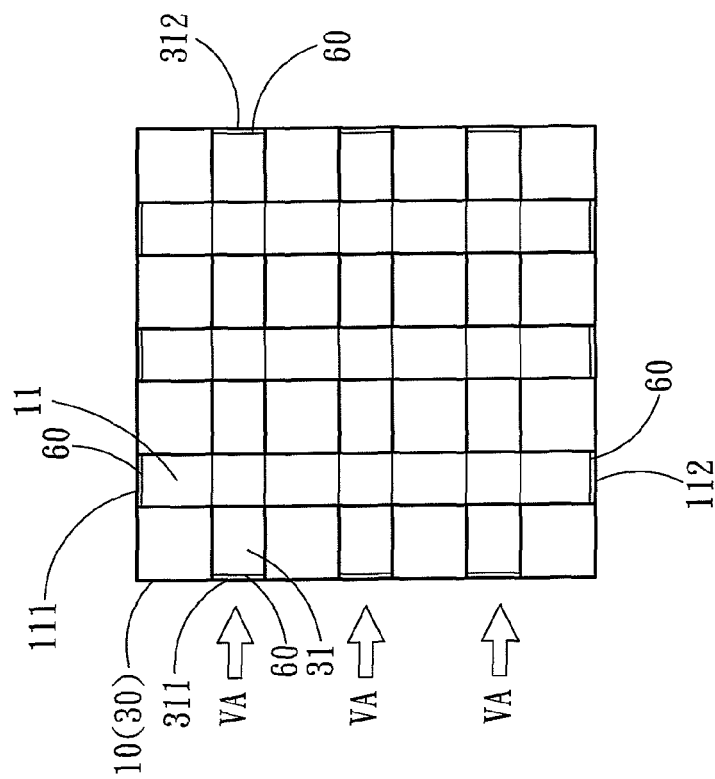
FIG. 5B is a diagram schematically showing a controller performs an analog-mode driving according to one embodiment of the present invention.
Figure 5A:
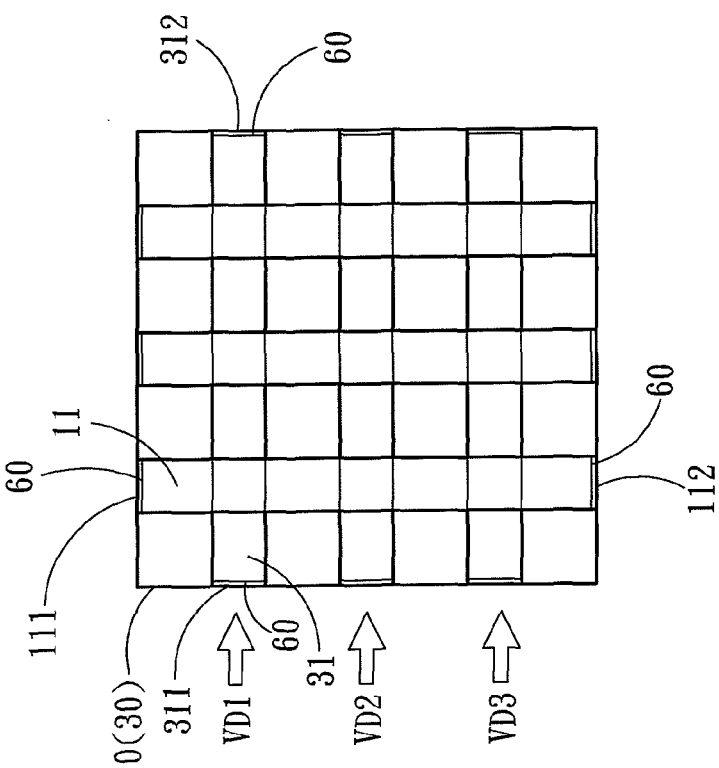
FIG. 5A is a diagram schematically showing a controller performs a digital-mode driving according to one embodiment of the present invention.

Refer to FIG. 4 and FIG. 5A. The touch layer 10 is superimposed on the sensing layer 30. In an automatic operation mode, the controller 40 alternately outputs digital-mode voltages VD and analog-mode voltages VA respectively corresponding to a plurality of digital time series TD and a plurality of analog time series TA that are alternately and consecutively provided. It should be particularly explained that FIG. 4 is only an exemplification of the time series. In the present invention, the digital-mode voltage VD is not necessarily smaller than the analog-mode voltage VA. Further, the digital time series TD and the analog time series TA respectively have time duration less than one second. For example, the time duration is 0.1 seconds. Thus, the digital-mode voltage VD is generated 5 times and the analog-mode voltage VA is also generated 5 times within one second. There are a plurality of touch loops 11 and a plurality of sensing loops 31. Thus, there are different digital-mode voltages VD1, VD2, and VD3 respectively corresponding to the touch loops 11 and sensing loops 31. The digital-mode voltages VD1, VD2 and VD3 are input to the first sensing terminals 311 via the conductive contact layers 60. When the touch loops 11 and the sensing loops 31 are short-circuited (i.e. the touch panel is pressed), the voltage differences occur, whereby the controller 40 can detect a digital short-circuit position where the touch loops 11 and the sensing loops 31 are short-circuited to determine the position where the touch panel is pressed. Thus, the multi-touch function is achieved in the present invention.

Refer to FIG. 5B. When the controller 40 is in the automatic detection mode, the analog-mode voltage VA is input to the first touch terminals 111 via the conductive contact layer 60. Herein, it should be noted that the identical analog-mode voltage VA is input to all the first touch terminals 111 simultaneously. Thereby, the first touch terminals 111, the second touch terminals 112, the first sensing terminals 311 and the second sensing terminals 312 are equivalently connected (i.e. have an identical electric potential) to form a four-wire analog resistive touch panel. When the touch loops 11 and the sensing loops 31 are short-circuited (i.e. the touch panel is pressed), the controller 40 can detect the divided voltages of the second touch terminals 112, the first sensing terminals 311 and the second sensing terminals 312 and calculate to obtain an analog short-circuit position where the touch loops 11 and the sensing loops 31 are short-circuited to determine the position where the touch panel is pressed. Thereby, the continuous drag path can be detected.

Figure 6:
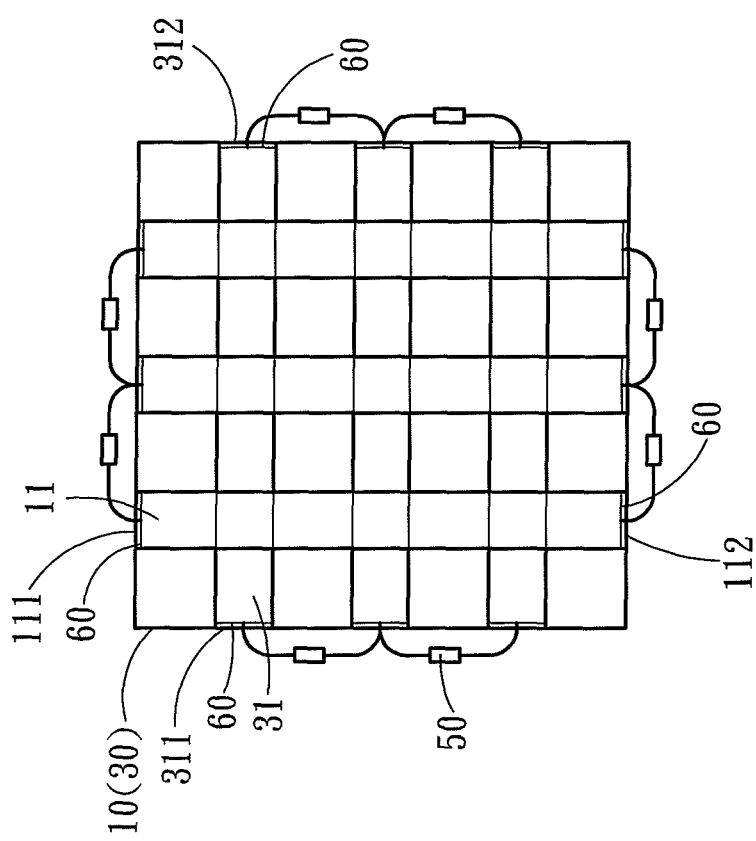
FIG. 6 is a diagram schematically showing the structure of a resistive touch panel capable of operating in a multi-touch control mode and a sensing-drag control mode synchronously according to another embodiment of the present invention.

Refer to FIG. 6. The first touch terminals 111 are connected by a plurality of transistors 50; so are the second touch terminals 112, the first sensing terminals 311 and the second sensing terminals 312. The transistors 50 are connected to the controller 40. When the analog-mode voltage VA is generated in the controller 40, the transistors 50 are controlled to be turned on to enable the first touch terminals 111, the second touch terminals 112, the first sensing terminals 311 and the second sensing terminals 312 to form a four-wire analog resistive touch panel.

Via a switch 41, the controller 40 can be switched from an automatic operation mode to a manual operation mode. Then, the resistive touch panel can be switched between the digital-mode driving only outputting the digital-mode voltage VD1, VD2 or VD3 and the analog-mode driving only outputting the analog-mode voltage VA. Thereby, the resistive touch panel can operate in the digital-mode driving of performing the multi-touch function or in the analog-mode driving of performing the drag path control function.

In conclusion, the controller 40 alternately and consecutively outputs the digital-mode voltages and the analog-mode voltages respectively corresponding to the digital time series TD and the analog time series TA in the automatic operation mode, whereby are detected the digital short-circuit positions and analog short-circuit positions to perform multi-touch control and sensing-drag control synchronously.

As the first touch terminals 111 and the second touch terminals 112 of the touch loops 11 and the first sensing terminals 311 and the second sensing terminals 312 of the sensing loops 31 are connected with the controller 40, the digital-mode voltages VD and analog-mode voltages VA are alternately input to realize synchronous operation of the multi-touch control and the sensing-drag control in the identical touch screen.

What is claimed is:

1. A resistive touch panel capable of operating in a multi-touch control mode and a sensing-drag control mode synchronously, comprising:

a touch layer including a plurality of strip-like touch loops, wherein each of the plurality of touch loops includes a first touch terminal, a second touch terminal, and two conductive contact layers respectively arranged at the first touch terminal and the second touch terminal;

a spacer layer being formed at a selected thickness;

a sensing layer including a plurality of strip-like sensing loops, wherein each of the plurality of sensing loops includes a first sensing terminal, a second sensing terminal, and two conductive contact layers respectively arranged at the first sensing terminal and the second sensing terminal, and wherein the touch layer and the sensing layer are separated by the spacer layer such that the touch loops and the sensing loops are arranged staggeredly up and down; and a controller connected to the first touch terminals, the second touch terminals, the first sensing terminals and the second sensing terminals via the conductive contact layers, wherein the controller automatically detects and outputs digital-mode voltages and analog-mode voltages respectively corresponding to a plurality of digital time series and a plurality of analog time series that are alternately and consecutively provided in an automatic operation mode, wherein in each of the plurality of digital time series, one digital-mode voltage is input to the first touch terminals and the first sensing terminals via the conductive contact layers, and when the touch loops and the sensing loops form short circuit, the controller detects a digital short-circuit position where the touch loops and the sensing loops are short-circuited and performs multi-touch judgment, and wherein in each of the plurality of analog time series, one analog-mode voltage is input to the first touch terminals via one conductive contact layer, and when the touch loops and the sensing loops form short circuit, the controller detects divided voltages of the second touch terminals, the first sensing terminals and the second sensing terminals and calculates to obtain an analog short-circuit position where the touch loops and the sensing loops are short-circuited and performs drag path judgment.

2. The resistive touch panel according to claim 1, wherein the analog-mode voltage is input to the first touch terminals simultaneously to allow the first touch terminals, the second touch terminals, the first sensing terminals and the second sensing terminals have an identical electric potential.

3. The resistive touch panel according to claim 1, wherein the first touch terminals are connected by a plurality of transistors; the second touch terminals being connected by a plurality of transistors; the first sensing terminals being connected by a plurality of transistors; and the second sensing terminals being connected by a plurality of transistors; the plurality of transistors being connected to the controller and turned on when the analog-mode voltage is generated in the controller.

4. The resistive touch panel according to claim 1, wherein the controller is connected to a switch, operation modes of the controller are switched manually via the switch to selectively output the digital-mode voltage or the analog-mode voltage.

5. The resistive touch panel according to claim 1, wherein the digital time series and the analog time series respectively have time duration less than one second.

* * * * *